United States Patent [19]

Huang

[11] Patent Number: 5,039,118
[45] Date of Patent: Aug. 13, 1991

[54] STROLLER WITH AN IMPROVED CONNECTOR

[76] Inventor: Ming-Tai Huang, No. 28-1, Napa Lin, Shin-Hwa Chen, Tainan Shien, Taiwan

[21] Appl. No.: 571,688

[22] Filed: Aug. 22, 1990

[51] Int. Cl.⁵ ............................................... B62B 7/08
[52] U.S. Cl. ............................ 280/47.371; 74/551.1; 74/551.3; 280/642; 403/96; 403/97
[58] Field of Search ...................... 403/84, 97, 96, 101; 74/551.1, 551.3, 551.4; 16/112; 280/641, 642, 647, 650, 655.1, 47.34, 47.371

[56] References Cited

U.S. PATENT DOCUMENTS

| | | | |
|---|---|---|---|
| 641,118 | 1/1900 | Kelly | 74/551.4 |
| 4,582,445 | 4/1986 | Warshawsky | 403/97 |
| 4,614,452 | 9/1986 | Wang | 403/97 X |
| 4,747,569 | 5/1988 | Hoshino | 403/97 X |
| 4,880,331 | 11/1989 | Zun | 403/97 X |
| 4,929,113 | 5/1990 | Sheu | 403/84 X |

Primary Examiner—Andres Kashnikow
Assistant Examiner—Michael Mar
Attorney, Agent, or Firm—Lowe, Price, LeBlanc and Becker

[57] ABSTRACT

A connector to join the backrest frames and the handle grip of a stroller includes a first and a second tubular member, a toothed wheel, a coil spring, a circular plate and a fastening device. The toothed wheel has a pair of shallow grooves and a pair of tapered grooves formed within its inner wall. The first tubular member has first annularly spaced teeth formed in its inner wall, which are adapted to accomodate the toothed wheel. The diameter of one end of the tubular member is smaller that that of the other end. The second tubular member has a closed end with a through hole and an open end. Second annularly spaced teeth are formed within its inner wall, which are aligned with the first annular teeth, so that the toothed wheel can slide axially within the confines of the first and the second tubular member when they are engaged. The circular plate has a pair of engaging members adapted to engage the pairs of grooves.

6 Claims, 5 Drawing Sheets

STROLLER WITH AN IMPROVED CONNECTOR

BACKGROUND OF THE INVENTION

The present invention relates to a connector more particularly to a connector suited for connecting two backrest frames and two free ends of a U-shape handle grip of a stroller.

A baby stroller of prior art consists two backrest frames 1, a seat mounted to said frames, a U-shaped handle grip 2 with two free ends and two connector 3 joining said two backrest frames to said free ends, as shown in FIG. 1.

FIG. 2 is an exploded view of the connector 3 of the stroller shown in FIG. 1. Accordingly, it includes a first tubular member 31 connected to one end of the handle grip, first annularly spaced teeth 311 being formed on its inner wall; a projection 312 having a through-bore formed in the first tubular member; three engaging slots 313 (only one is shown in FIG. 2) also formed on the inner wall of the tubular member; a toothed wheel 33 having a through hole 331 and being adapted to fit through the first annularly spaced teeth, said projection 312 passing through the through hole 331; a locking member 32 having three resilient ribs 321, each of which has a hooked tip, said locking member being adapted to engage the first tubular member and lock said engaging slots by means of the hooked tips of the resilient ribs of the same; a second tubular member 11 connected to one of the backrest frames 1, having a closed end and an open end, said closed end having a through hole therein; second annularly spaced teeth 111 having a thickness greater than that of the first annularly spaced teeth so as to fully engage the toothed wheel, being formed within its inner wall, the second annularly spaced teeth being aligned with the first annularly spaced teeth; a spring retainer 112 having a through hole therein, is integrally formed with the second tubular member; a coil spring 113 disposed around the spring retainer in the second tubular member; and a bolt 41 passing through the holes in the projection 312 of the first tubular member, the toothed wheel, the spring retainer of the second tubular member to be secured by a nut 42.

FIG. 3 shows a cross sectional view of the connector of FIG. 1. Accordingly, the first tubular member 31 is locked by the locking member 32. The coil spring 113 is disposed around the spring retainer 112 and abutting the toothed wheel 33 to lay between the first and the second toothed grooves and engages them. Therefore the first tubular member 31 can not be rotated to adjust the angle of the U-shaped handle grip, as shown in FIG. 3. When one wishes to adjust the angle of the handle grip, he has to press the locking member 32 so as to press the toothed wheel 33 into the second annularly spaced teeth 111 whereby the first annularly spaced teeth are disengaged and therefore the first tubular member 31 can be rotated, see in FIG. 4. Pressing the locking member and simutaneously turning the first tubular member is not very convenient for the user. An easier way to accomplish the effect would be far better.

SUMMARY OF THE INVENTION

It is therefore a main object of the present invention to provide a connector suitable for connecting two backrest frames to two free ends of a handle grip of a stroller, which connector facilitates adjustment of the angle of the handle grip.

According to the present invention, a connector suited to connect the two backrest frames to the two free ends of U-shaped handle grip of a stroller includes a first tubular member connected to one of two backrest frames, said first tubular member having a first rim, a second rim opposite to the first rim, and an internal wall. First annularly spaced teeth are formed in said internal wall, the first rim has wavy portion formed thereon and the second rim has a diameter smaller than that of the first rim. The connector further comprises a toothed wheel having through bore, a first pair and a second pair of engaging members formed in the through bore, said tooth wheel being adapted to fit into and engage the first annular teeth of the first tubular member. The connector further comprises second tubular member connected to one end of U-shaped handle grip and having a closed end with a through hole therein, an open end and an internal wall, a spring retainer protruding from said closed end, second annularly spaced teeth formed on said internal wall, said open end having wavy portion thereon and being adapted to engage said first tubular member; a coil spring disposed around the spring retainer; a circular plate having a through hole therein and a pair of engaging members thereon, being adapted to engage said first pair and said second pair of engaging members, said plate rotatably fitable in the second rim of said first tubular member adjacent to said first annularly spaced teeth; and a fastening means.

BRIEF DESCRIPTION OF THE DRAWING

Other features and advantages of the present invention will become more apparent in the following detailed description including drawings, all of which show a non-limiting form of the invention, in which.

DETAILED DESCRIPTION OF THE PREFERRED EMBODIMENT

Figure 1:
FIG. 1 shows a connector of the prior art, joining the backrest frames to the ends of U-shaped handle grip of a stroller.
Figure 2:
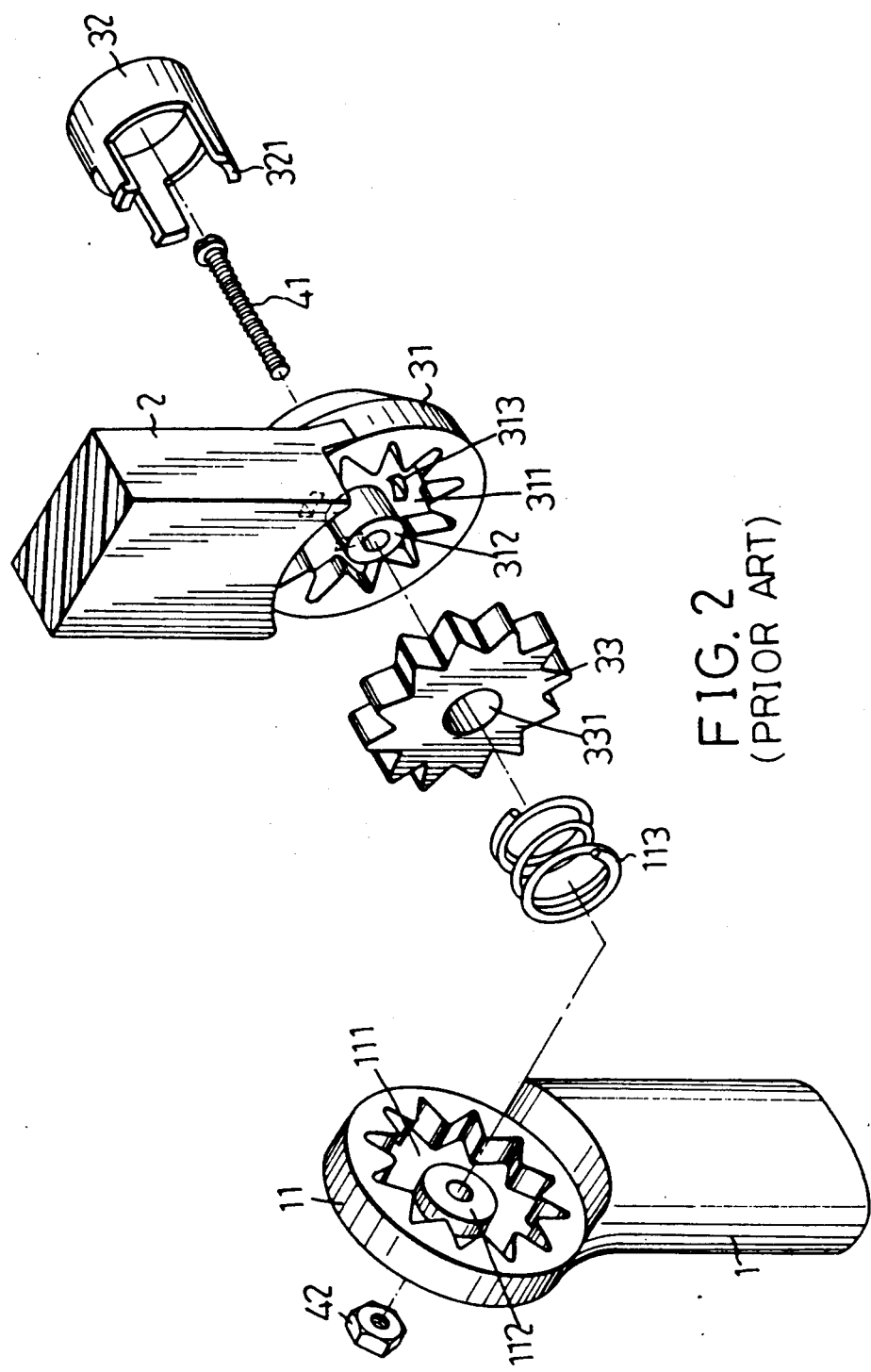
FIG. 2 is an exploded view of the connector of the prior art.
Figure 4:
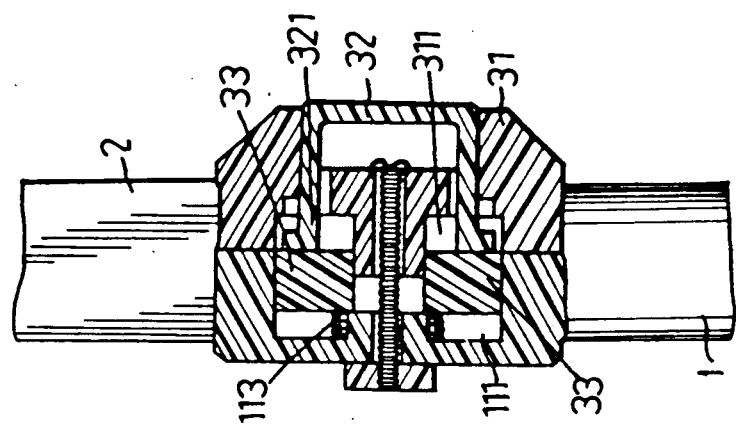
FIG. 4 is a cross sectional view of the connector of the prior art, showing the configuration when the angle of the handle grip can be adjusted.
Figure 3:
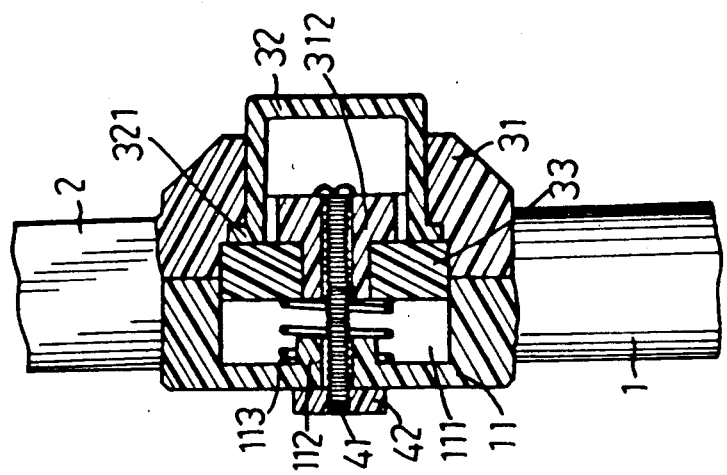
FIG. 3 is a cross sectional view of the connector of the prior art, showing the configuration when the angle of the handle grip can not be adjusted.
Figure 5:
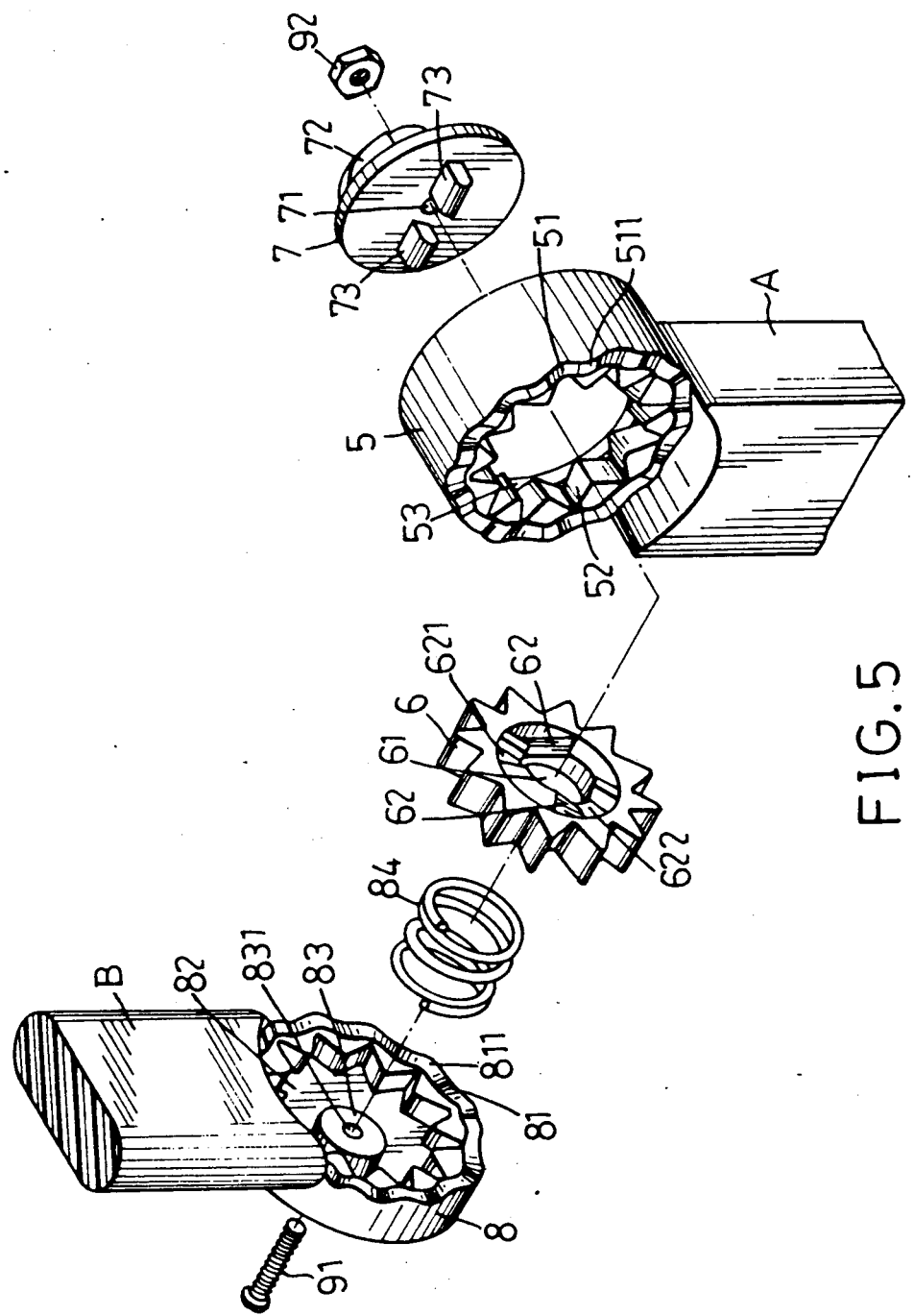
FIG. 5 is an exploded view of the connector according to the present invention.

FIG. 5 shows an exploded view of a connector of the present invention includes a toothed wheel 6 having a through bore 61, a first pair of shallow grooves 621 and a second pair of tapered grooves 622 in the inner wall 62 of the through bore; a first tubular member 5 connected to one of the backrest frames A and having a first and a second open end and an inner wall, first annularly spaced teeth 52 formed in the inner wall, said first annularly spaced teeth being adapted to accomodate said toothed wheel, said second open end having a diameter smaller than that of the first end so as to prevent the toothed wheel from sliding through the same, said first end having a corrugated edge. A second tubular member 8 is connected to one of the two ends of the handle grip and has a closed end, a open end and an inner wall, said open end 81 having corrugated edge 811 adapted to engage said first end of said first tubular member, said closed end having a through hole 831 and a spring retainer 83 projecting therefrom, second annularly spaced teeth 82 formed in the inner wall, said second annularly spaced teeth being aligned with the first annularly spaced teeth so that the toothed wheel can slide axially within the first and the second annularly spaced teeth. A coil spring 84 is disposed around the spring retainer 83 of the second tubular member, so the spring abuts the toothed wheel from within. A plate 7 with a handle 72, a through hole 71, and a pair of engaging members 73, is rotatably fit into the second end of the first tubular member adjacent the first annularly spaced teeth. A bolt 91 and a nut 92 fasten together the second tubular member, the coil spring, the toothed wheel, the first tubular member and the plate.

Figure 7:
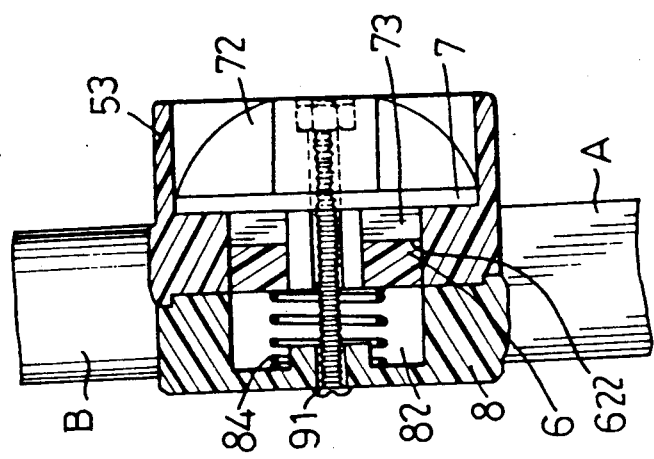
FIG. 7 is a cross sectional view of the connector of the present invention, showing the configuration when the angle of the handle grip can be adjusted.
Figure 6:
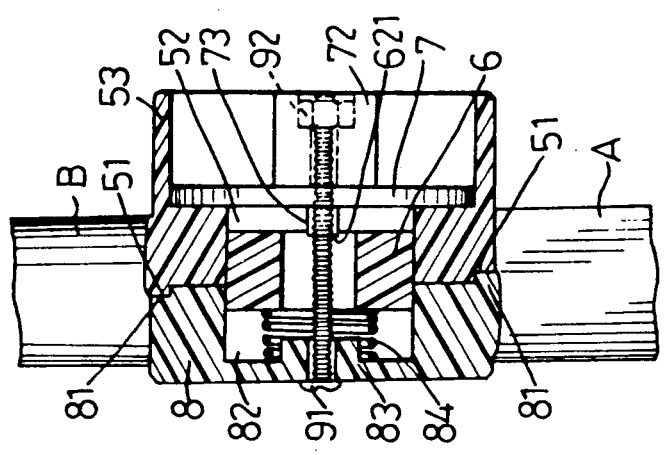
FIG. 6 is a cross sectional view of the connector of the present invention, showing the configuration when the angle of the handle grip can not be adjusted.

FIG. 6 is a cross sectional view of the connector, showing the position when the engaging members 73 of the plate 7 engage the first pair of shallow grooves 621 in the toothed wheel 6, in which orientation the coil spring 84 is compressed and the toothed wheel is disposed across the first and the second annularly spaced teeth, preventing the tubular members from rotation relative to each other thus also preventing adjustment or unintentional alteration in the angle of the handle grip. The plate 7 can be rotated so as to extract the engaging members from the first pair of shallow grooves 621, so they engage the second pair of tapered grooves 622 in which configuration the coil spring 84 pushes the toothed wheel fully into the confines of the first annularly spaced teeth, free from the second annularly spaced teeth, thus allowing the second tubular member to be rotated relative to the first, permiting adjustment of the angle of the handle grip of the stroller, as best shown in FIG. 7. After adjustment the plate 7 is rotated to lock the handle in the new position. Counter rotation of the plate is made possibly by the second pair of tapered grooves 622, which allow the engaging members 73 of the plate 7 to slide in and out.

While the invention has been described in connection with what is considered to be the most practical and preferred embodiment, the invention is not to be limited to the disclosure only, but on the contrary it is intended to cover various modifications and equivalent arrangements within the broadest interpretation of the present invention so as to emcompass all such modifications and equivalent arrangements.

I claim:

1. A stroller including a pair of backrest frames and a U-shaped handle grip with two free ends, and two connectors adjustably and respectively connecting said pair of backrest frames to said two free ends of said U-shaped handle grip, each of said connectors comprising:
   a toothed wheel having a through bore;
   a first tubular member connected to one of said pair of backrest frames, and having an internal wall, a first rim and a second rim, first annularly spaced teeth formed in said internal wall, said teeth being adapted to accommodate said toothed wheel, said second rim having a diameter smaller than that of said first rim so as to prevent said toothed wheel from sliding through said second rim;
   a second tubular member connected to one of said two free ends of said handle grip, and having a closed end, an open end and an internal wall, second annularly spaced teeth formed in said internal wall, said second annularly spaced teeth being aligned with said first annularly spaced teeth so that said toothed wheel is slidable axially within the confines of said first and second teeth when said first and said second tubular member are engaged, said closed end having a through hole;
   a coil spring disposed between said closed end of said second tubular member and said toothed wheel, urging the two apart;
   a plate having a pair of engaging members thereon and a hole therethrough, said plate being adapted to fit rotatably in said second rim of said first tubular member adjacent to said first annularly spaced teeth; and
   a fastening means to fasten together said second tubular member, said toothed wheel, said first tubular member and said plate, wherein the improvement is characterized by said toothed wheel having a first pair of grooves and a second pair of grooves in said through bore, each pair of grooves being adapted to engage an releasably retain said pair of engaging members of said plate whereby when said plate is rotated to engage and releasably retain said first pair of grooves, said toothed wheel is disposed between said first and said second annularly spaced teeth thereby locking said first annularly spaced teeth to said second annularly spaced teeth, so that said second tubular member cannot be rotated to adjust the angle of said U-shaped handle grip, and when said plate is rotated to engage said second pair of engaging members, said coil springs urges said toothed wheel into a fully received position within said first annularly spaced teeth and free of contact with said second annularly spaced teeth, so as to allow said second tubular member to rotate, and permitting adjustment of the angle of said U-shaped handle grip of said stroller.

2. A stroller as claimed in claim 1, wherein said connector further comprises a spring retainer projecting from said closed end around which said coil spring is disposed.

3. A stroller as claimed in claim 1, wherein said fastening means is a bolt and a nut.

4. A stroller as claimed in claim 1, wherein said first rim of said first tubular member and said first rim of said second tubular member have corrugated adjacent edges, one being adapted to engage the other when said first and said second tubular members are secured.

5. A stroller as claimed in claim 1, wherein said first pair of grooves of said through bore of said toothed wheel are short grooves axially formed within the same.

6. A stroller as claimed in claim 1, wherein said second pair of grooves of said through bore of said toothed wheel are tapered grooves axially formed within the same.

* * * * *